June 27, 1933.  J. M. KELLER  1,915,935

SHOCK COMPENSATOR

Filed Nov. 17, 1930   2 Sheets-Sheet 1

INVENTOR.
John M. Keller
BY
Ray Oberlin & Ray
ATTORNEY.S.

June 27, 1933.    J. M. KELLER    1,915,935
SHOCK COMPENSATOR
Filed Nov. 17, 1930    2 Sheets-Sheet 2

INVENTOR.
John M. Keller
BY
Ray Oberlin & Ray
ATTORNEYS.

Patented June 27, 1933

1,915,935

UNITED STATES PATENT OFFICE

JOHN M. KELLER, OF LAKEWOOD, OHIO

SHOCK COMPENSATOR

Application filed November 17, 1930. Serial No. 496,118.

This invention relates, as indicated, to a shock compensator or shock absorber designed to be used as a means interposed between the relatively moving parts of a vehicle, such as the frame and the axle, or wheel supporting structure thereof, to supplement the resilient effect of the springs normally supporting the body of the vehicle, so that excessive shock to which the wheel supporting structure of the vehicle is subjected will not be transmitted to its full extent to the body of the vehicle.

In order that a shock compensator, or so-called shock absorber operate efficiently for the purpose for which it is designed, it is necessary that such compensator permit free relative movement between the body of the vehicle and the wheel supporting structure thereof for all relatively small shocks which will be sufficiently dampened by the action of the resilient spring means normally supporting the body. However, the compensator must be so designed that all excessive shocks to the wheels or their supporting structure will not be transmitted directly to the body of the vehicle. In other words, as the vehicle, such as an automobile, is driven over a relatively smooth pavement or roadway, the compensator will not be brought into operation, but will only act to dampen the shock when the wheel of the car passes over an abrupt projection in the road or drops into a sharp depression of appreciable magnitude. It is among the objects of this invention to provide an apparatus having all of the above named desirable characteristics.

To the accomplishment of the foregoing and related ends, said invention, then, consists of the means hereinafter fully described and particularly pointed out in the claims. The annexed drawings and the following description setting forth in detail certain mechanism embodying the invention, such disclosed means constituting, however, but one of the various mechanical forms in which the principle of the invention may be used.

Figure 1:
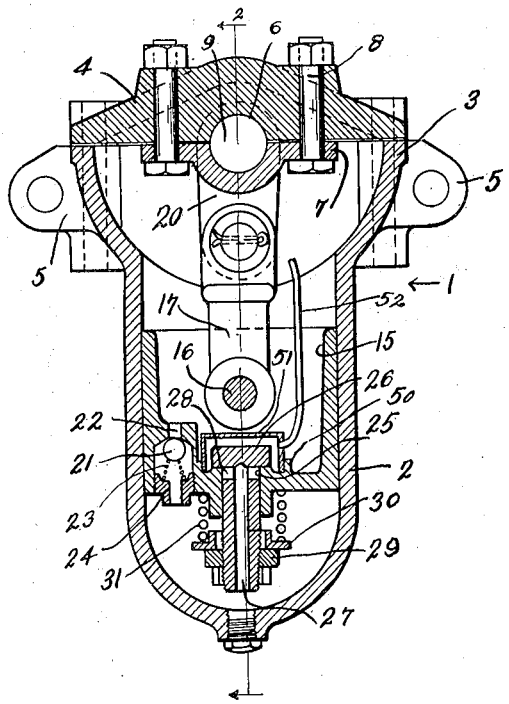
Figure 2:
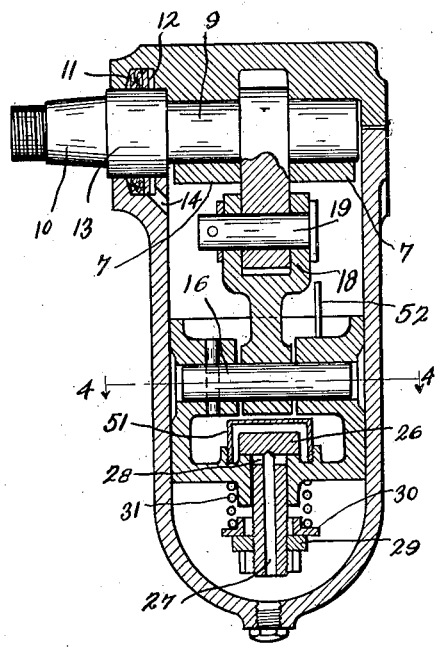
Figure 3:
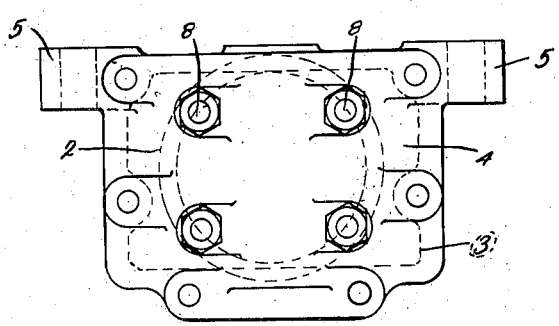
Figure 4:
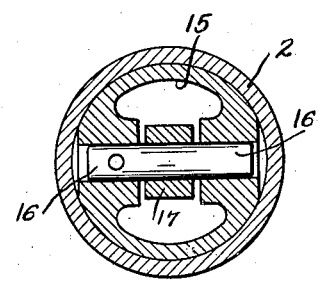
Figure 5:
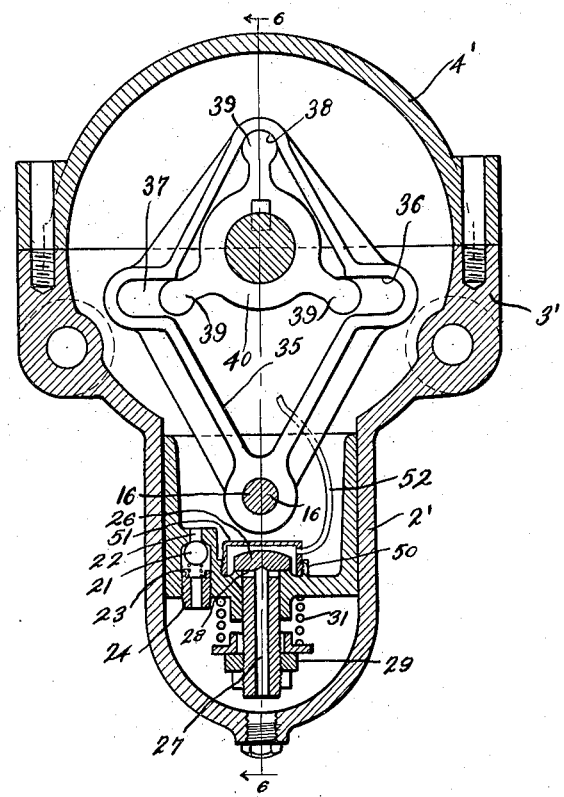
Figure 6:
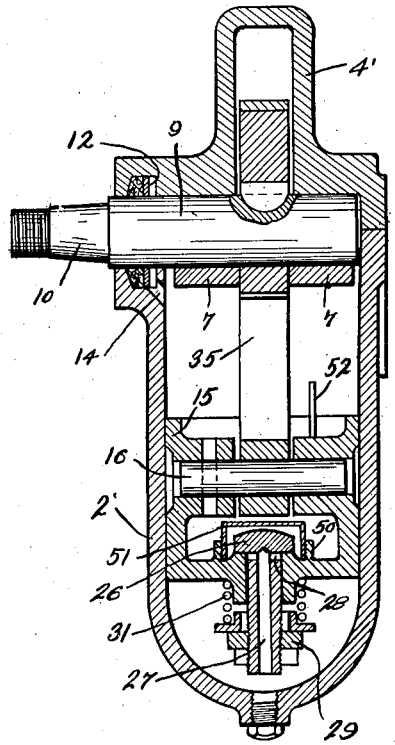
Figure 8:
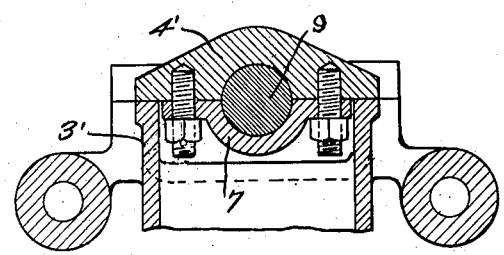
Figure 7:
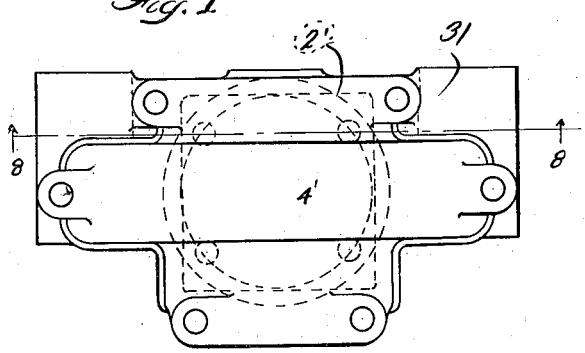

In said annexed drawings:

Fig. 1 is a part sectional, part elevational view of one form of the apparatus comprising my invention; Fig. 2 is a sectional view of the apparatus illustrated in Fig. 1, taken on a plane substantially indicated by the line 2—2; Fig. 3 is a plan view of the apparatus illustrated in the previous figures; Fig. 4 is a transverse sectional view of the apparatus illustrated in the previous figures, taken on a plane substantially indicated by the line 4—4 in Fig. 2; Fig. 5 is a part sectional part elevational view of an alternative form of construction of the apparatus embodying the principles of my invention; Fig. 6 is a sectional view of the apparatus illustrated in Fig. 5, taken on a plane substantially indicated on the line 6—6; Fig. 7 is a plan view of the apparatus illustrated in Figs. 5 and 6, and Fig. 8 is a fragmentary sectional view of a portion of the apparatus illustrated in Fig. 7 taken on a plane substantially indicated by the line 8—8.

Referring more specifically to the drawings and more especially to Figs. 1 to 4 both inclusive, the specific embodiment of the principles comprising my invention as illustrated in these figures, consists of a body member generally indicated at 1 which has a substantially tubular portion 2, and a substantially rectangular portion 3. The rectangular portion 3 is closed by a removable cap 4, such cap being secured to the body by suitable bolts or the like. The body portion 3 is provided with laterally extending lugs 5, by which the apparatus may be suitably secured to the mounting block or like means provided therefor on the vehicle with which the apparatus is employed. The inner face of the closure cap 4 is provided with a transversely extending, substantially semi-cylindrical groove 6, which along with a complementary groove formed on the juxtaposed face of the cap members 7 secured thereto by means of a bolt 8, serves as a bearing support for a shaft 9 which projects laterally from the body of the apparatus in a preferably tapered portion 10 adapted to receive the actuating lever of the apparatus. The walls of the body portion 3, and cap member 4 are provided with complementary recesses for packing material 11 which is axially supported in such apertures by means of a corrugated washer 12 mounted coaxially with the enlarged portion 13 of the shaft 9. The aperture containing the packing material 11 and corrugated washer 12 has in communication therewith a tube or aperture 14 which serves as a means for the return flow of any fluid working its way along the shaft 9 into the aperture receiving the packing material 11, and the corrugated washer 12. The efficiency of such packing material and washer for the purposes of restraining the escape of liquid from the confines of the body of the apparatus is materially enhanced by the branch aperture 14 which operates in conjunction with the corrugated washer to immediately return all liquid passing to the packing material to the cavity within the body of the apparatus.

The tubular portion 2 has slidably mounted therein a piston 15 which is provided with the usual wrist pin 16, and connecting rod 17. The connecting rod 17 is terminally bifurcated as at 18, and is pivotally secured by means of a pin 19 to a crank arm 20 secured to the shaft 9. The head of the piston 15 is provided with a ball valve 21 adapted to normally close the fluid passage 22 under the influence of a compression spring 23 maintained in assembled relation by means of a cap 24 threadably engaged by the head of the piston. The head of the piston has centrally positioned therein an aperture 25 which slidably receives and supports a plunger valve member 26. The plunger valve member 26 is provided with an axial bore 27 which has in communication therewith, radially extending branch bores 28 extending through the wall of the valve members surrounding the axial bore 27. The shank of the valve member 26 is threadably engaged by an adjusting and securing nut 29 which axially supports a cap or washer member 30, which in turn serves as an abutment for one end of a compression spring 31, and at its other end is in contact with the head of the piston 15. The spring 31 therefore maintains the valve member 26 in the position illustrated in Fig. 1, so that the branch ports 28 are closed by the sides or inner wall of the aperture 25 in the head of the piston in which such valve member is oscillatably supported.

In order that the device may be operated with a minimum amount of liquid within the confines of the body member 1 and yet so that lubrication of the moving parts within such body be insured, I may provide an annular boss 50 on the upper or inner surface of the head of the piston 15, which boss is preferably co-axial with the valve member 26, and threadably receives a cap 51 which has associated therewith a fluid delivery conduit 52 which extends upwardly toward the moving parts within the substantially rectangular portion 3 of the body member 1. The cap 51 and its associated tube 52 will cause all of the fluid which passes upwardly through the valve member 26 to be projected against the moving parts, thereby effecting the proper lubrication thereof when the liquid level is below such parts.

The operation of the apparatus constructed in accordance with the principles above described may briefly be explained as follows: The apparatus, i. e., the relatively moving parts thereof will normally occupy the position illustrated in Figs. 1 and 2, and the stub shaft 10 will have secured thereto the crank arm connected at its other end to one of the relatively moving parts of the vehicle, such as the body portion or the wheel supporting structure. As relative movement occurs between the parts of the vehicle normally inter-connected and supported by means of the usual type of leaf spring, rotation of the shaft 9 will likewise occur through the connection previously described. Rotation of the shaft 9 will cause a corresponding rotation of the crank arm 20 which will, through connecting rod 17, cause an axial movement of the piston 15 within the cylindrical or tubular portion 2. As hereinbefore indicated, the cavity within the apparatus is filled with a suitable liquid, which upon axial movement of the piston 15, will flow from the upper cavity to the cavity below such piston through the port normally closed by the ball 21. The strength of the spring 23 being relatively weak, no considerable force will retard the down flowing liquid from passing from the upper chamber in the cavity to the lower chamber. When the relatively moving parts of the vehicle attempt to move to a position opposite from that to which they have been moved by the aforesaid impact or shock, such movement will be considerably dampened and restrained by the liquid within the lower cavity or chamber, being forced to flow from the lower chamber through the valve member 26. The valve member 26 remains closed until the pressure within the lower chamber is sufficient to move such valve member axially upward against the action of the relatively strong spring 31. Thus the proper shock compensation is accomplished for the purposes most clearly defined at the outset of this description. The employment of the crank arm 20 in association with the connecting rod 17, and further, the relative position of the several parts is such, that as will be apparent to those familiar with the art, slight relative movement of the body of the vehicle and the wheel supporting structure thereof, may occur without any appreciable relative movement between the piston 15 and the tubular member 2, so that the springs which support the vehicle body may efficiently absorb all slight shocks to which the wheel structure of the vehicle is subjected, in passing over a relatively smooth roadway, and yet, when such wheel structure is subject to a severe shock, the compensator is effective to absorb such shock, and prevent the same from being transmitted from the wheel structure to the body of the vehicle.

A modification of the hereinbefore described form of construction, and in some respects, the preferred form of such construction is illustrated in Figs. 5 to 8, and consists of a tubular body portion 2′ in association with a substantially rectangular body portion 3′, which is closed by a cover member 4′ which is secured to the body portion 3′ by bolts or the like. This form of construction is identical in every other respect with the exception of the form of construction of the means interconnecting the shaft 9 and the piston 15.

In this form of construction the wrist pin 16 has oscillatably secured thereto an actuating member 35, which is substantially in the form of a parallelogram having recesses 36, 37 and 38 formed in the corners thereof adapted to receive and engage radially extending projections 39, preferably formed integrally with a hub or collar 40 keyed to the shaft 9. It will be understood that the portion 40 and its associated arms 49 may be formed integrally with the shaft 9 instead of being keyed thereto as is illustrated in these figures.

The advantage of this form of construction resides in the fact that the action of this apparatus more closely approaches the ideal conditions required than does any form of construction heretofore employed. The various relatively moving elements will, under normal circumstances, occupy the position illustrated in Fig. 1, so that upon any relative movement of the body of the car or vehicle and the wheel supporting structure thereof, the shaft 9 will be permitted to rotate through a short arc without effecting any material movement of the piston 15, so that the springs on the vehicle will be permitted to absorb all of the small shocks to which the wheels are subjected. However, when a severe shock is encountered, causing a considerable relative movement of the wheels and the body of the vehicle, a relatively greater movement of the piston 15, with respect to the movement of the lever secured to the shaft 9 will result than in any forms of construction theretofore employed. For this reason this latter described form of construction most efficiently accomplishes the purpose for which it is designed. The operation of the piston and its associated fluid by-passing means in this latter form of construction is identical with that first described, so that a further consideration thereof is believed unnecessary. A further description of the principles comprising my invention is believed unnecessary for those familiar with the art. Suffice it to say that numerous changes may be made in the detail form of construction herein illustrated and described for purposes of convenience without departing from the underlying principles of my invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a shock compensator for vehicles, the combination of a closed body; a shaft oscillatable upon relative movement of two parts of such vehicle, extending into said body; a piston reciprocable in said body, dividing the same into two compartments; means interconnecting said shaft and piston; relief valve means retarding the flow of fluid from one of such compartments to the other; and means associated with said relief valve means for projecting a stream of such fluid over the working parts in said body.

2. In a shock compensator for vehicles, the combination of a closed body; a shaft oscillatable upon relative movement of two parts of such vehicle, extending into said body; a piston reciprocable in said body, dividing the same into two compartments; means interconnecting said shaft and piston; relief valve means respectively admitting fluid flow from either chamber to the other upon selective movement of said piston; and means associated with said relief valve means for projecting a stream of such fluid over the working parts in said body.

3. In a shock compensator, the combination of a housing including a cylinder, an oscillatable shaft; a piston in said cylinder axially oscillatable upon oscillation of said shaft; and means interconnecting said piston and shaft, said means including a frame pivotally secured to said piston and provided with three bearing recesses on its inner periphery, and means associated with said shaft for engaging each of said recesses.

4. In a shock compensator, the combination of a housing including a cylinder, an oscillatable shaft; a piston in said cylinder axially oscillatable upon oscillation of said shaft, and means interconnecting said piston and shaft, said means including a frame pivotally secured to said piston and provided with a plurality of bearing recesses on its inner periphery, and means associated with said shaft for respectively engaging said recesses.

5. In a shock compensator, the combination of a housing including a cylinder, an oscillatable shaft; a piston in said cylinder axially oscillatable upon oscillation of said shaft; and means interconnecting said piston and shaft; said means including a frame pivotally secured to said piston and provided with a bearing recess normally on a line with the axes of said shaft and the point of pivotal support of said frame, and other bearing recesses spaced symmetrically on opposite sides of said line of axes; and means associated with said shaft for engaging each of said recesses.

6. In a shock compensator, the combination of a housing including a cylinder, an oscillatable shaft; a piston in said cylinder axially oscillatable upon oscillation of said shaft; and means interconnecting said piston and shaft; said means including a frame pivotally secured to said piston and provided with a bearing recess diametrically opposed to its point of pivotal support; and other bearing recesses spaced symmetrically on opposite sides of a line joining said first named bearing recess and said point of pivotal support; and means associated with said shaft for engaging each of said recesses.

7. In a shock compensator, the combination of a housing including a cylinder, an oscillatable shaft; a piston in said cylinder axially oscillatable upon oscillation of said shaft; and means interconnecting said piston and shaft; said means including a frame pivotally secured to said piston and provided with three bearing recesses on its inner periphery, and means associated with said shaft in engagement with one of said recesses and selectively movable into and out of engagement with the other of said recesses upon rotation of said shaft.

8. In a shock compensator, the combination of a housing including a cylinder, an oscillatable shaft; a piston in said cylinder axially oscillatable upon oscillation of said shaft; and means interconnecting said piston and shaft; said means including a frame pivotally secured to said piston and provided with a bearing recess normally on a line with the axes of said shaft and the point of pivotal support of said frame, and other bearing recesses spaced symmetrically on opposite sides of said lines of axes; and means associated with said shaft in engagement with said first named recess, and other means associated with said shaft selectively engaging either of said last named recesses upon rotation of said shaft.

Signed by me this 8th day of November, 1930.

JOHN M. KELLER.